(12) United States Patent
Kang et al.

(10) Patent No.: US 8,185,506 B2
(45) Date of Patent: *May 22, 2012

(54) UNIFIED MANAGEMENT METHOD OF VARIOUS TYPES OF MESSAGES OF A PERSONAL INFORMATION TERMINAL

(75) Inventors: Yun Gyu Kang, Koonpu-si (KR); Byung Hak Jung, Seoul (KR); Yong Soo Shin, Anyang-si (KR); Su Young Pan, Seoul (KR); Sang Bum Kim, Goyang-si (KR); Seung Ho Lee, Goonpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,067

(22) Filed: May 12, 2011

(65) Prior Publication Data

US 2011/0214083 A1 Sep. 1, 2011

Related U.S. Application Data

(63) Continuation of application No. 12/559,834, filed on Sep. 15, 2009, now Pat. No. 7,958,099, which is a continuation of application No. 10/118,943, filed on Apr. 10, 2002, now Pat. No. 7,603,379.

(30) Foreign Application Priority Data

| Apr. 11, 2001 | (KR) | 01-19389 |
| Apr. 11, 2001 | (KR) | 01-19390 |
| Apr. 24, 2001 | (KR) | 01-21910 |

(51) Int. Cl.
*G06F 17/13* (2006.01)
*G06F 7/00* (2006.01)

(52) U.S. Cl. ..... 707/684; 707/922; 709/206; 455/412.1; 455/414.4; 455/466

(58) Field of Classification Search ................. 707/694, 707/690, 691, 922; 709/206; 455/412.1, 455/414.4, 466

See application file for complete search history.

(56) References Cited

U.S. PATENT DOCUMENTS 4,837,798 A * 6/1989 Cohen et al. ............ 379/88.14
(Continued)

FOREIGN PATENT DOCUMENTS

EP 777394 6/1997
(Continued)

OTHER PUBLICATIONS

McCracken, H. "One Mailbox, Indivisible?" PC World, vol. 18, No. 4, p. 39, Apr. 2000.

(Continued)

*Primary Examiner* — Sherief Badawi
(74) *Attorney, Agent, or Firm* — Ked & Associates LLP

(57) ABSTRACT

A mobile terminal includes a display and a controller. The display outputs a first input window configured to receive a first message. When input data is received into at least one message field of the first input window, the controller determines whether or not the input data conforms to a format of the first input window corresponding to the first message. The controller also outputs a notification after the input is determined not to conform to the format corresponding to the first input window corresponding to the first message. The display outputs a second input window to receive a second message. The second input window has at least one message field different from the message fields in the first input window.

20 Claims, 9 Drawing Sheets

U.S. PATENT DOCUMENTS

| | | | | |
|---|---|---|---|---|
| 5,333,266 A * | 7/1994 | Boaz et al. | | 709/206 |
| 5,872,926 A * | 2/1999 | Levac et al. | | 709/206 |
| 5,946,629 A * | 8/1999 | Sawyer et al. | | 455/466 |
| 5,991,365 A * | 11/1999 | Pizano et al. | | 379/88.13 |
| 6,055,240 A * | 4/2000 | Tunnicliffe | | 370/428 |
| 6,061,572 A * | 5/2000 | Laiho | | 455/466 |
| 6,061,718 A * | 5/2000 | Nelson | | 709/206 |
| 6,072,862 A * | 6/2000 | Srinivasan | | 379/100.08 |
| 6,081,703 A * | 6/2000 | Hallqvist | | 455/406 |
| 6,134,432 A * | 10/2000 | Holmes et al. | | 455/412.1 |
| 6,151,507 A * | 11/2000 | Laiho et al. | | 455/466 |
| 6,175,858 B1 * | 1/2001 | Bulfer et al. | | 709/206 |
| 6,178,331 B1 * | 1/2001 | Holmes et al. | | 455/466 |
| 6,212,550 B1 * | 4/2001 | Segur | | 709/206 |
| 6,298,128 B1 * | 10/2001 | Ramey et al. | | 379/142.01 |
| 6,333,973 B1 * | 12/2001 | Smith et al. | | 379/88.12 |
| 6,411,685 B1 * | 6/2002 | O'Neal | | 379/88.14 |
| 6,424,828 B1 * | 7/2002 | Collins et al. | | 455/412.1 |
| 6,560,318 B1 * | 5/2003 | Spielman et al. | | 379/88.12 |
| 6,594,484 B1 * | 7/2003 | Hitchings, Jr. | | 455/414.1 |
| 6,625,258 B1 * | 9/2003 | Ram et al. | | 379/88.13 |
| 6,650,890 B1 * | 11/2003 | Irlam et al. | | 455/412.1 |
| 6,738,635 B1 * | 5/2004 | Lewis et al. | | 455/466 |
| 6,778,642 B1 * | 8/2004 | Schmidt et al. | | 379/88.13 |
| 6,981,023 B1 * | 12/2005 | Hamilton et al. | | 709/206 |
| 7,171,190 B2 * | 1/2007 | Ye et al. | | 455/412.1 |
| 7,313,106 B2 * | 12/2007 | Steinberg | | 370/328 |
| 7,603,379 B2 * | 10/2009 | Kang et al. | | 1/1 |
| 7,761,498 B2 * | 7/2010 | Petry et al. | | 709/201 |
| 2002/0007397 A1 * | 1/2002 | Ouzounidis et al. | | 709/206 |
| 2002/0016735 A1 * | 2/2002 | Runge et al. | | 705/14 |
| 2002/0069048 A1 * | 6/2002 | Sadhwani et al. | | 704/3 |
| 2002/0111167 A1 * | 8/2002 | Nguyen et al. | | 455/435 |
| 2002/0124057 A1 * | 9/2002 | Besprosvan | | 709/219 |
| 2002/0152220 A1 * | 10/2002 | Kang et al. | | 707/101 |
| 2002/0155849 A1 * | 10/2002 | Urano et al. | | 455/466 |
| 2002/0160757 A1 * | 10/2002 | Shavit et al. | | 455/414 |
| 2003/0016639 A1 * | 1/2003 | Kransmo et al. | | 370/335 |
| 2003/0104827 A1 * | 6/2003 | Moran et al. | | 455/466 |
| 2003/0223551 A1 * | 12/2003 | Kafri | | 379/88.13 |
| 2004/0029598 A1 * | 2/2004 | Guggisberg | | 455/466 |
| 2004/0057403 A1 * | 3/2004 | Jerbi et al. | | 370/329 |
| 2004/0058673 A1 * | 3/2004 | Irlam et al. | | 455/412.1 |
| 2004/0203610 A1 * | 10/2004 | Deeds | | 455/412.1 |
| 2005/0015443 A1 * | 1/2005 | Levine et al. | | 709/204 |
| 2005/0018819 A1 * | 1/2005 | Schmidt et al. | | 379/88.13 |
| 2005/0266832 A1 * | 12/2005 | Irlam et al. | | 455/412.2 |
| 2006/0072143 A1 * | 4/2006 | Wilson | | 358/1.15 |
| 2006/0128409 A1 * | 6/2006 | Gress et al. | | 455/466 |
| 2006/0155808 A1 * | 7/2006 | Irlam et al. | | 709/203 |
| 2006/0195540 A1 * | 8/2006 | Hamilton et al. | | 709/206 |
| 2007/0283039 A1 * | 12/2007 | Kim et al. | | 709/238 |

FOREIGN PATENT DOCUMENTS

| | | |
|---|---|---|
| GB | 2389274 | 3/2003 |
| JP | 11-328070 | 11/1999 |
| KR | 2000-0050036 | 8/2000 |

OTHER PUBLICATIONS

Noh, Seung-Hwan, "System and Method for offering E-mail to SMS Message and Voice", English language translation of Korean Patent Publication KR2000-0050036 downloaded from KIPO website, Aug. 5, 2000.

Clark, C. "Unified Messaging: Where's the Market?" Wireless Review, vol. 16, No. 3, pp. 100-106, Feb. 1, 1999.

Dallas Morning News "GTE Copr.'s New Messaging Service to Combine Fax, Voice and E-Mail", Jun. 8, 1999.

Alwang, G. "Unified Messaging", PC Magazine, p. 114, Aug. 1, 1999.

Grigonis, R. and Friesen, B. "Everything, All the Time Unified Messaging", Computer Technology, vol. 7, No. 8, p. 50, Aug. 1999.

Korean Office Action dated Apr. 29, 2009.

* cited by examiner

FIG. 3

| Field | Size (Byte) | Index | Description |
|---|---|---|---|
| ID | 8 | | number point a message uniquely |
| Date/Time | 8 | use | Date and Time when a message is arrived or transmitted |
| Type/Opened | 1 | use | unread e-mail message : 0<br>opened e-mail message : 1<br>unread SMS message : 2<br>opened SMS message : 3 |
| Receiver | 64 | use | information of a receiver |
| Sender | 64 | use | information of a sender |
| Title | 80 | use | title of e-mail message or full or a part of a SMS message |
| Size | 10 | | size of an actual message |

FIG. 4

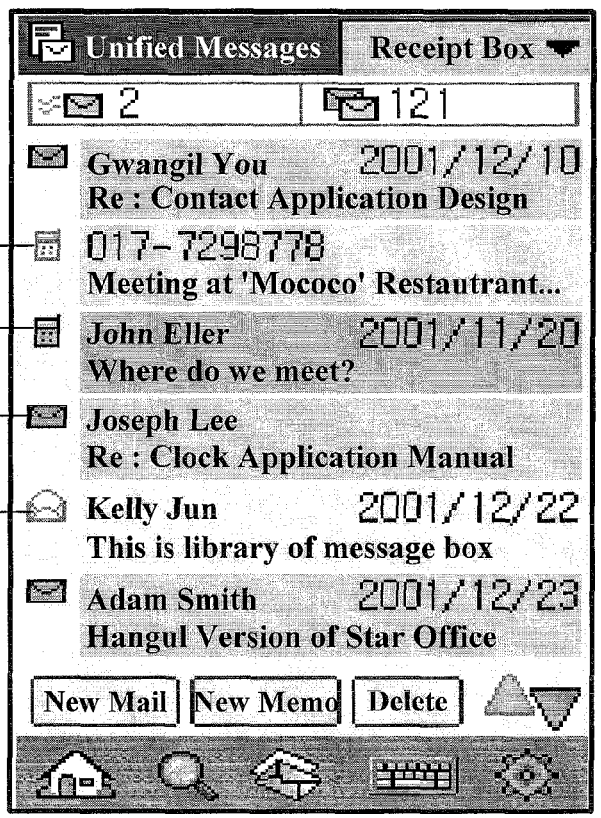

icon for opened SMS message
icon for unread SMS message
icon for unread e-mail message
icon for opened e-mail message

UNIFIED MANAGEMENT METHOD OF VARIOUS TYPES OF MESSAGES OF A PERSONAL INFORMATION TERMINAL

This is a Continuation of U.S. patent application Ser. No. 12/559,834 filed Sep. 15, 2009 now U.S. Pat. No. 7,958,099, which is a Continuation of U.S. patent application Ser. No. 10/118,943 filed Apr. 10, 2002 now U.S. Pat. No. 7,603,379, which claims the benefit of the Korean Application Nos. 01-19389 and 01-19390 filed Apr. 11, 2001, and Korean Patent Application No. 01-21910 filed Apr. 24, 2001, the disclosures of where are incorporated herein by reference.

BACKGROUND

1. Field

One or more embodiments herein relate to electronic messaging.

2. Background

Remarkable technology development is making a cellular phone and a PCS phone much smaller, lighter and cheaper, so that a mobile phone is being popularized widely and rapidly. In these days, various mobile information terminals other than the popularized mobile phone are being introduced too. Among those mobile information terminals, a PDA (Personal Digital Assistant) stands in the spotlight of consumers.

Some PDAs equip with a CDMA wireless modem which can communicate signals with a CDMA mobile communication network, thus, a person carrying such a PDA is able to use a mobile communication network or to communicate data through a mobile communication network anytime and anywhere. In other words, a user with such a PDA can use not only Short Message Service (SMS) of a mobile communication network but also data communication such as e-mail transmitting/receiving through traffic channels allocated in air link of a mobile communication network.

However, the SMS of a mobile communication network and the e-mail service of a data network are totally different each other in protocol. Namely, the SMS uses a protocol specified by a mobile communication network whereas the e-mail service uses Post Office Protocol (POP)/Simple Mail Transfer Protocol (SMTP) agreed with a data server. Because the SMS and the e-mail service are conducted according to the mutually different protocols, the PDA has in general two built-in message management (editing, displaying, transmitting, etc.) application programs, one for message to be received/transmitted through SMS which is called 'SMS message' hereinafter, and the other for message to be received/transmitted through e-mail service which is called 'mail message' hereinafter. Thus, two separate DBs are prepared for SMS messages and mail ones respectively.

However, users do not know well the fact that the SMS message and the mail message exist separately due to such technical differences. Instead, they feel only inconvenience of message management because there are two separate methods which conduct same function, namely, message delivery. For example, when a user completes a SMS message, it can not be transmitted if it is against SMS protocol, e.g., if an e-mail address is entered as a recipient's address. In this case, a mail management application program should be executed newly. Then, because the application program to send a message is changed, the previously entered message is not preserved. Therefore, a user should re-write the same message or copy and paste the previous message into the mail management application program. This procedure to correct protocol mismatched inputs is somewhat boring to a user.

Moreover, a user also feels boring in message storing and searching work because of two separate methods of same function. Namely, if a user can not remember exactly whether a message he or she wrote is a SMS or a mail one, same message searching operations would be conducted individually with the two message-related applications.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 3 shows a format of a unified message management table;

FIG. 4 shows a list of two types of messages displayed all together;

DETAILED DESCRIPTION

Figure 1:
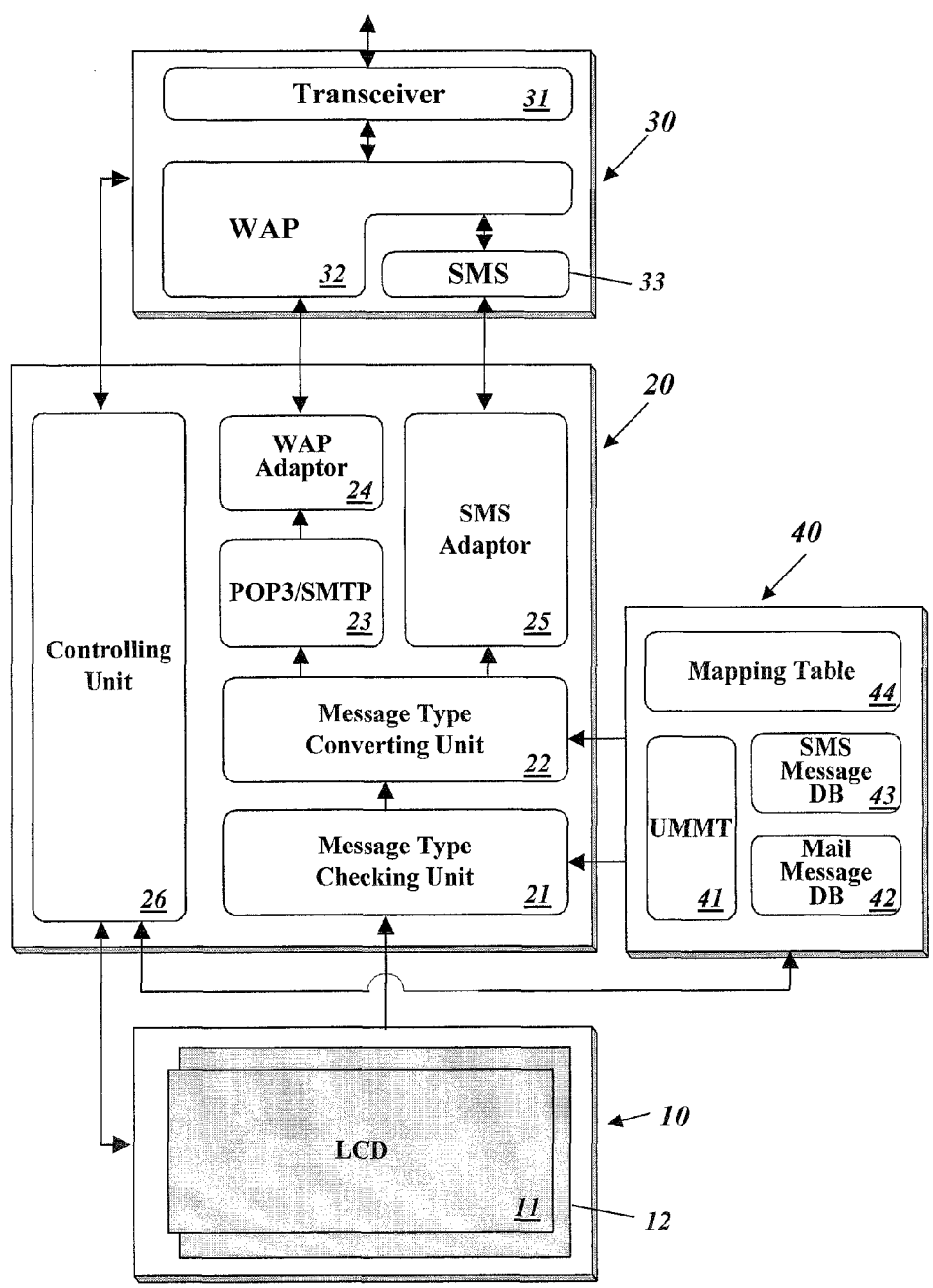
FIG. 1 is a block diagram of one embodiment of a personal information terminal conducting a unified management method of plural types of messages.

FIG. 1 is a block diagram of one embodiment of a personal information terminal conducting a unified management method of various types of messages. The personal information terminal of FIG. 1 comprises an I/O module 10 for inputting/outputting data; a storage module 40 for storing several DBs or data tables; a communicating module 30 for conducting data communication; and a controlling module 20 for controlling data input/output, data conversion, and data communication.

In details, the I/O module 10 includes a wide LCD 11 for displaying information and a touch screen 12 for data input, the communicating module 30 includes a signal transceiver 31 transmitting/receiving wireless signals; a WAP unit 32 conducting WAP (Wireless Application Protocol) which ensures reliability of wireless data communication; and a SMS unit 33 allocating/extracting SMS messages to/from signal channels, and the controlling module 20 includes a message type checking unit 21 checking which type a written message belongs to; a message type converting unit 22 converting the format of a written message to match to other type based on whether it is matched with its intended type; a POP3/SMTP unit 23 formatting a mail message to the e-mail protocol and retrieving a mail message vice versa; a WAP format adapting unit 24 adapting a POP/SMTP-formatted message to wireless transmission conditions and decoding received wireless signals to obtain digital data; a SMS format adapting unit 25 adapting a message to SMS protocol and retrieving a SMS message from the received wireless signals; and a controlling unit 26 supervising operations of all elements overall.

Figure 2:
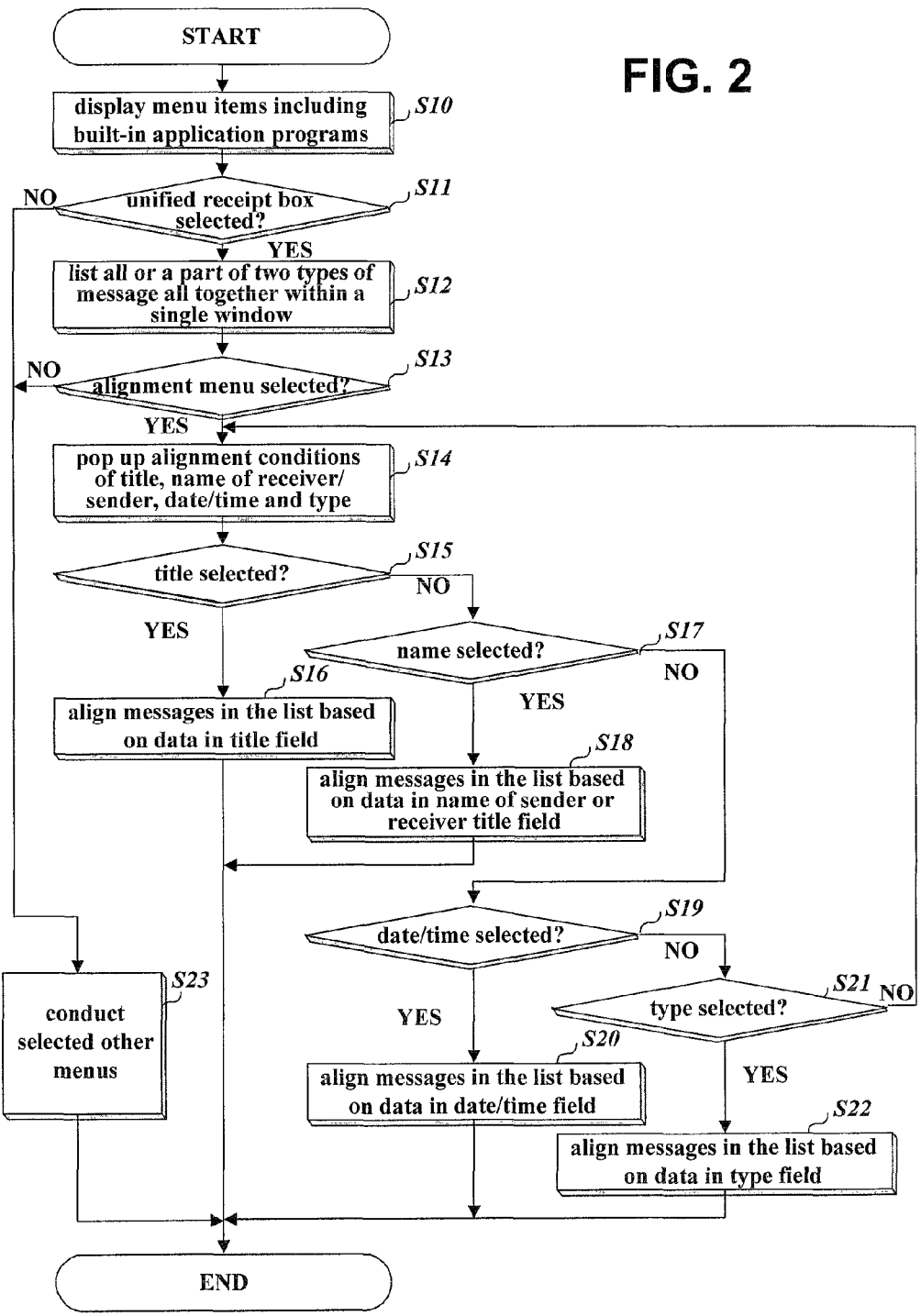
FIG. 2 is a flow chart of an embodiment of displaying received messages all together regardless of their types in accordance with a unified message management method of a personal information terminal.

FIG. 2 is a flow chart of an embodiment of displaying received messages all together regardless of their types of a personal information terminal in accordance with a unified message management method. The procedure of FIG. 2 conducted in the personal information terminal of FIG. 1 is explained below in detail.

First, the controlling unit 26 displays a variety of built-in application programs and menu items onto the wide LCD 11 to be selected by a user (S10).

If a user clicks a unified receipt box among displayed items (S11), the controlling unit 26 searches both a mail message DB 42 and a SMS message DB 43 having been created in the storage module 40. All messages stored in the two DBs 42 and 43 have been received from outside. The two separate DBs 42 and 43 may be integrated into one DB.

In addition, a unified message management table (UMMT) 41 has been created in the storage module 40. The UMMT 41 is used for unified management of the two DBs 42 and 43 which contain different types of messages, respectively.

FIG. 3 shows the format of the UMMT 41. The fields of an entry of the UMMT 41 are compose of 'Message ID' identifying a message uniquely, 'Date/Time' indicative of date and time when a message is received (for receipt box) or transmitted (for transmitted box), 'Type/Opened' indicative of message type and whether a message is opened or not, 'Receiver' and 'Sender' in which addresses of receiver and sender are filled in respectively, 'Title' in which title of a mail message is written or full or partial SMS message is written, and 'Size' indicative of the size of an actual message.

The 'Message ID' links each entry of the UMMT 41 with a corresponding actual message written in the mail message DB 42 or the SMS message DB 43. The 'Date/Time', name of 'Receiver' or 'Sender', 'Title', 'Type/Opened' field may be used for arranging condition.

The controlling unit 26 sequentially reads all entries of the UMMT 41, configured as above, stored in the storage module 40, and lists all or a part of them within a single window on the wide LCD 11, as shown in FIG. 4 (S12). At this time, the controlling unit 26 does not refer the mail message DB 42 and the SMS message DB 43 when it displays only title for a mail message and a short part of message for a SMS message. However, it reads out contents of respective messages from the two DBs 42 and 43 with reference to the message IDs written in each 'Message ID' field of the UMMT 41 when it has to show mail message and SMS message fully.

Specific fields are expressed differently based on message type. For example, information written in 'Sender' field is expressed in the form of e-mail address when the message type is mail, and in the form of telephone subscriber number when the type is SMS.

In the meantime, the controlling unit 26 may insert different icons with different color, which are determined based on the information written in 'Type/Opened' field, before every displayed items in the message list as shown in FIG. 4, as a result, a user can easily recognize which messages are not read yet and which type they belong to.

Figure 5:
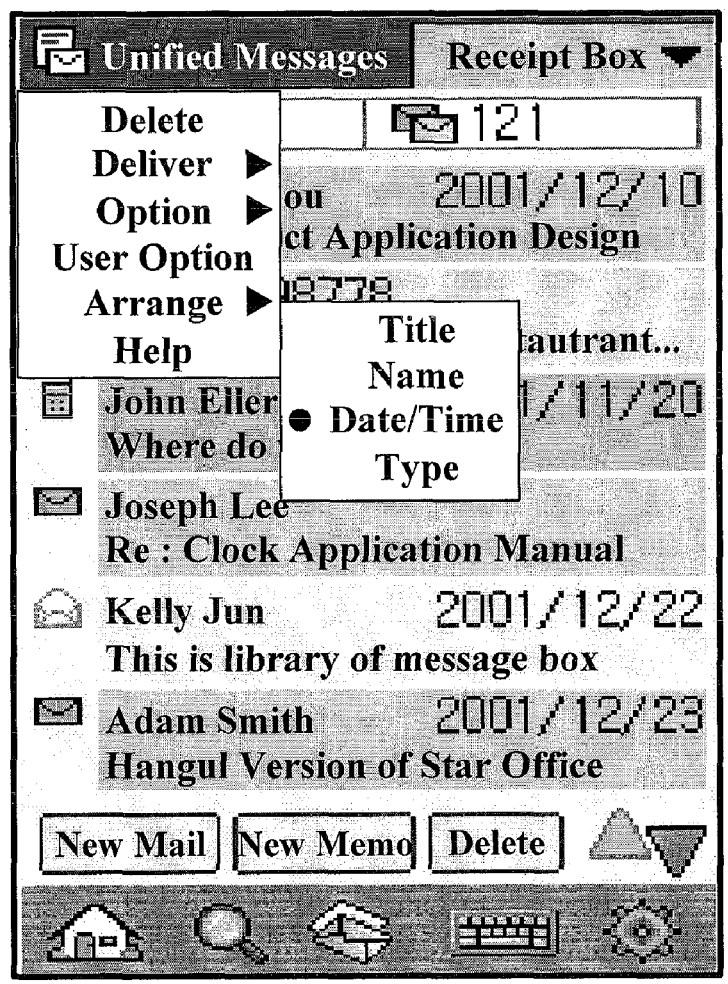
FIG. 5 shows an example of arrangement conditions for two types of messages displayed all together in a list.

Afterwards, if the user selects 'Arrange' menu item (S13) in the condition that main menu of the unified receipt box is opened, the controlling unit 26 pops up a sub-menu composed of arrangement conditions of title, name (address) of receiver/sender, date/time, and message type, as shown in FIG. 5 (S14). If the user chooses one of the arrangement conditions (S15,S17,S19,S21) the messages in the list are re-arranged in ascending or descending alphanumeric order with respect to the chosen field (S16,S18,S20,S22).

The type arrangement condition may have sub-arrangement condition of 'Opened' which determines which one of unread messages and opened ones is displayed first. Through the above-explained method, a user can check all messages by listing messages once irrespective of their types.

Figure 6A:
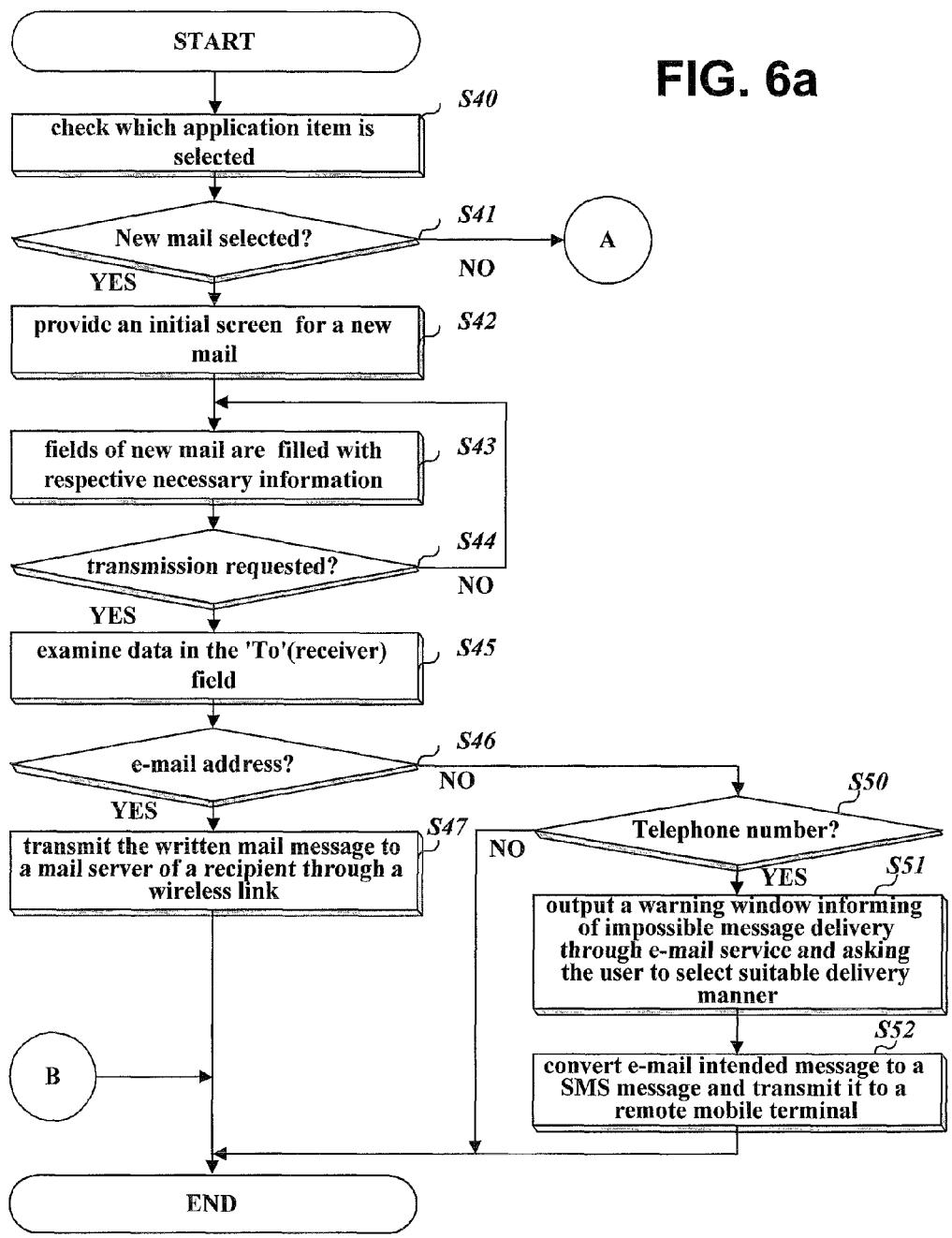
FIGS. 6a and 6b are flow charts of an embodiment of selecting message transmitting manner suitable to the type of a written message in accordance with a unified message management method of a personal information terminal.
Figure 6B:
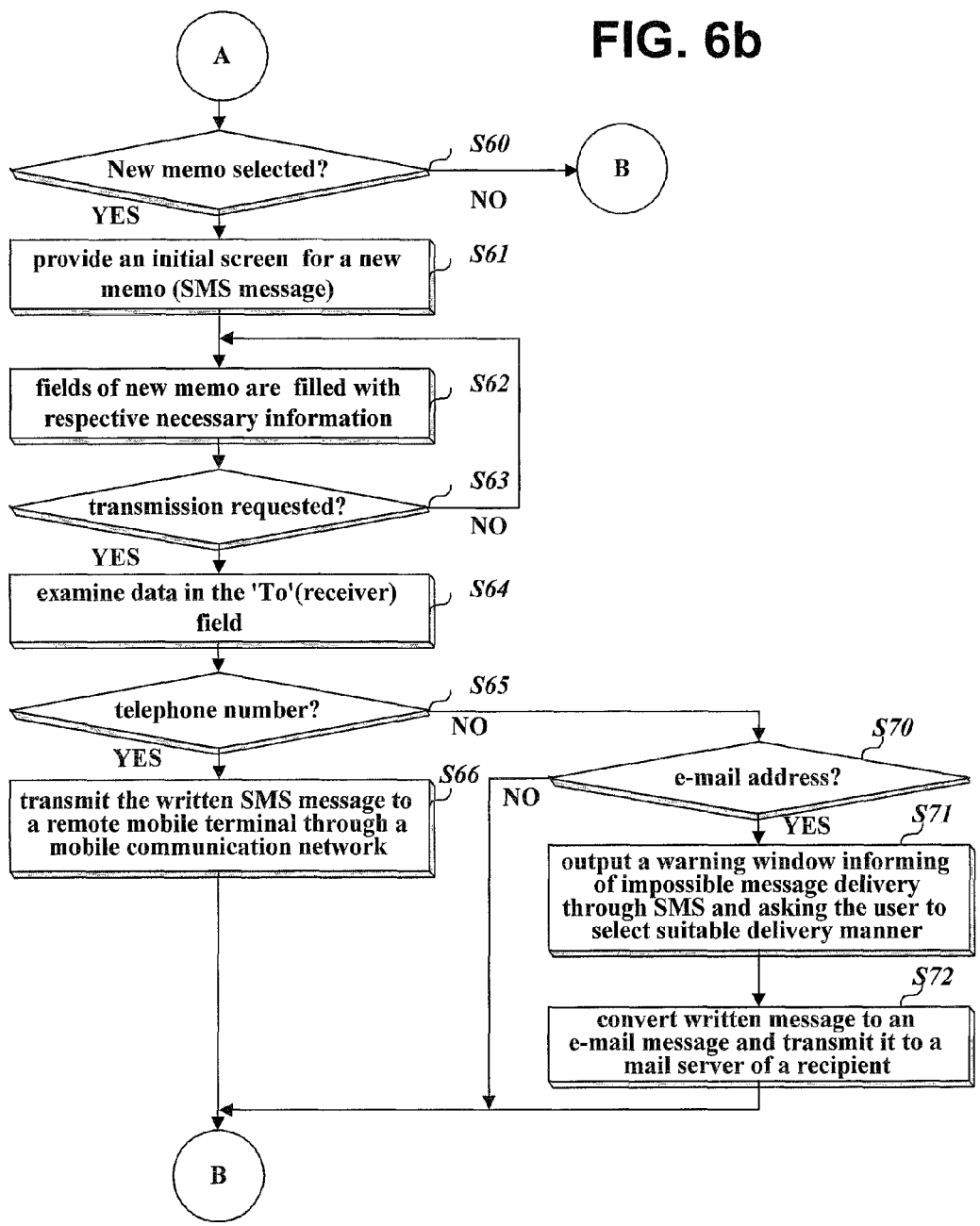

FIGS. 6*a* and 6*b* are flow charts of an embodiment of selecting message transmitting manner suitable to the type of a written message in a personal information terminal in accordance with a unified message management method. The procedure of FIGS. 6*a* and 6*b* conducted in the personal information terminal of FIG. 1 are explained below in detail.

Figure 7:
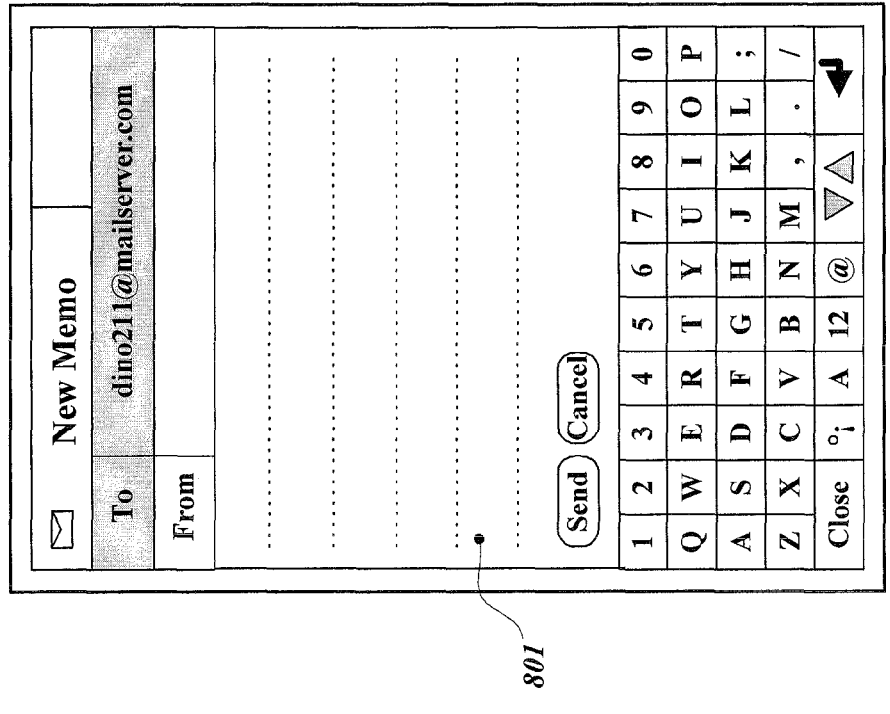
FIG. 7 shows a 'New Mail' input screen in which a warning window asking to switch to 'New Memo' is popped up when a recipient field is filled in with a telephone number.

First, the controlling unit 26 checks which application item is selected through the touch screen 12 by a user (S40). If a 'New Mail' item is chosen by the user (S41) because an e-mail is intended to send, the controlling unit 26 provides an initial screen for a new mail which includes 'To', 'CC', 'Attached', 'Title' field, and message input window 701, as shown in FIG. 7 (S42). Then, the user fills in the 'To' and the 'Title' with respective necessary information without exception and fills in the 'CC' and the 'Attached' field, if needed. Afterwards, the user writes a message to send in the message input window 701. Through these filling-in works, a mail message to send is completed (S43).

When the user requests for transmission of the completed mail message (S44), the controlling unit 26 commands the message type checking unit 21 to verify the completed message. The message type checking unit 21 examines the data written in the 'To' field (S45). If the data written in the 'To' field includes a symbol '@', indicative of mail account, as well as alphanumeric characters (S46), the message type checking unit 21 delivers the completed message to the message type converting unit 22 while informing the message type converting unit 22 that the message is format-matched and requesting no-conversion of message type at the same time. Then, the message type converting unit 22 only delivers the received message to the POP3 unit 23 without type conversion. The completed message sent to the POP3 unit 23 is formatted to the mail protocol and transmitted to a target mail server through a wireless link (S47).

If the data written in the 'To' field is composed of numeric digits not including the symbol of '@' (S50), the message type checking unit 21 informs the controlling unit 26 of the fact. Then, the controlling unit 26 pops up a warning window 710 which informs of impossible message delivery of the completed message through e-mail service and asks the user to change delivery manner of the completed mail message (S51), as shown in FIG. 7.

If the user agrees to type converted delivery by clicking 'OK' button on the warning window 710, the controlling unit 26 commands the message type converting unit 22 to convert the completed message received from the message type checking unit 21 to a SMS-formatted message. Then, before delivering the received message to the SMS format adapting unit 25, the message type converting unit 22 slices the written message into suitable-sized ones, which will be individually sent to the SMS format adapting unit 25 like as an independent SMS message, if the message length is beyond the limit of one message, and it composes a string indicative of filename and full pathname of an attached file if a file is attached in the 'Attached' field and appends the composed string to the written message, and it also adds a text in the 'Title' before the body message.

The SMS format adapting unit 25 adds necessary header and additional information to the completed message or the respective sliced messages in accordance with SMS protocol. The SMS-formatted message or messages are transmitted to a remote mobile phone through a wireless link (S52).

Figure 8:
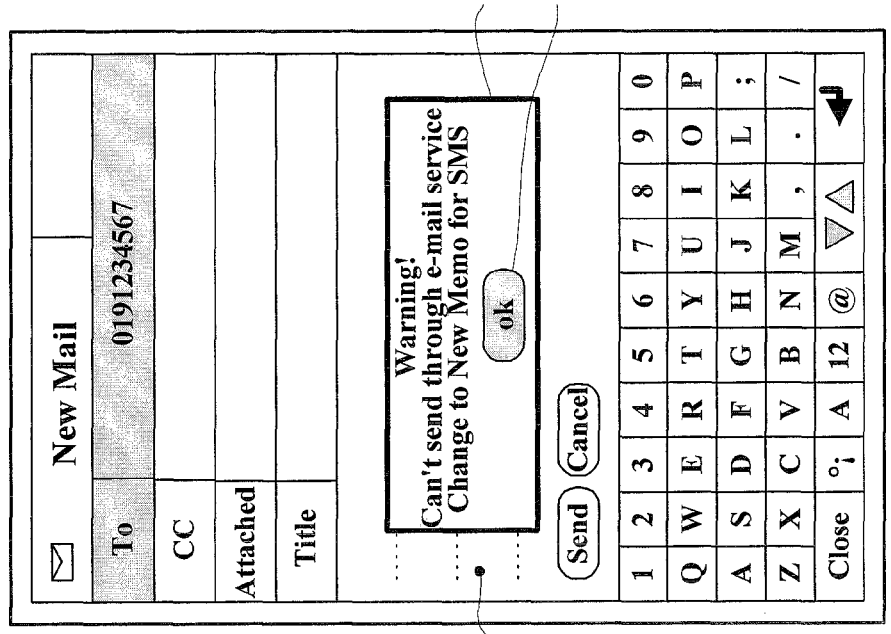
FIG. 8 is an illustrative 'New Memo' input screen of which recipient field is filled in with an e-mail address.

If a 'New Memo' item is chosen for SMS message transmission by the user (S60) instead of 'New Mail', the controlling unit 26 provides an initial screen for a new memo which includes 'To', 'From', and a message input window 801 onto the wide LCD 11, as shown in FIG. 8 (S61). At this time, the 'From' field may be omitted. If omitted, a subscriber number having been stored in an internal memory by the user is appended to a written memo by the SMS format adapting unit 25 to form a complete SMS message.

If the user requests for transmission of a written memo (S63) after filling in each field in an input screen of FIG. 8 with respective necessary information (S62), the message type checking unit 21 examines the data written in the 'To' field (S64) as explained above. If the data written in the 'To' field includes only numeric digits (S65), the completed memo is delivered to the SMS format adapting unit 25 which transmits it to a remote side (S66) after formatting to a SMS message.

However, if the data written in the 'To' field includes the symbol of '@' indicative of a mail account (S70) as shown in FIG. 8 the controlling unit 62 pops up a warning window which informs of impossible message delivery of the completed memo through SMS and asks the user to change delivery manner of the completed SMS message to e-mail service (S71).

If the user agrees to type converted delivery the message type converting unit 22 conducts conversion of the written SMS message to e-mail format, namely, it creates 'CC' and 'Attached' field additionally, writes null data in those fields respectively, and delivers the field-added message to the POP3/SMTP unit 23. The POP3 unit 23 formats the field-added message to the mail protocol and then transmits it to a mail server of a recipient via a WAP unit 32 (S72).

In the above procedures of memo composition and transmission thereof, even though the user fills in the 'To' field with proper numeric digits the controlling unit 26 may not transmit the written memo in the form of SMS message. Instead, the following additional verification and procedures based on the result of the verification may be conducted.

The message type checking unit 21 further counts alphanumeric characters written in the message input window 801 of FIG. 8, even though the 'To' field is filled in with proper numeric data, and informs the counted size of the memo to the controlling unit 26. Then, the controlling unit 26 checks whether the informed size is beyond the maximum size, e.g., 50 bytes allowed in a single SMS message. If below the maximum size, the controlling unit 26 makes the written memo be sent in the form of SMS message.

Figure 9:
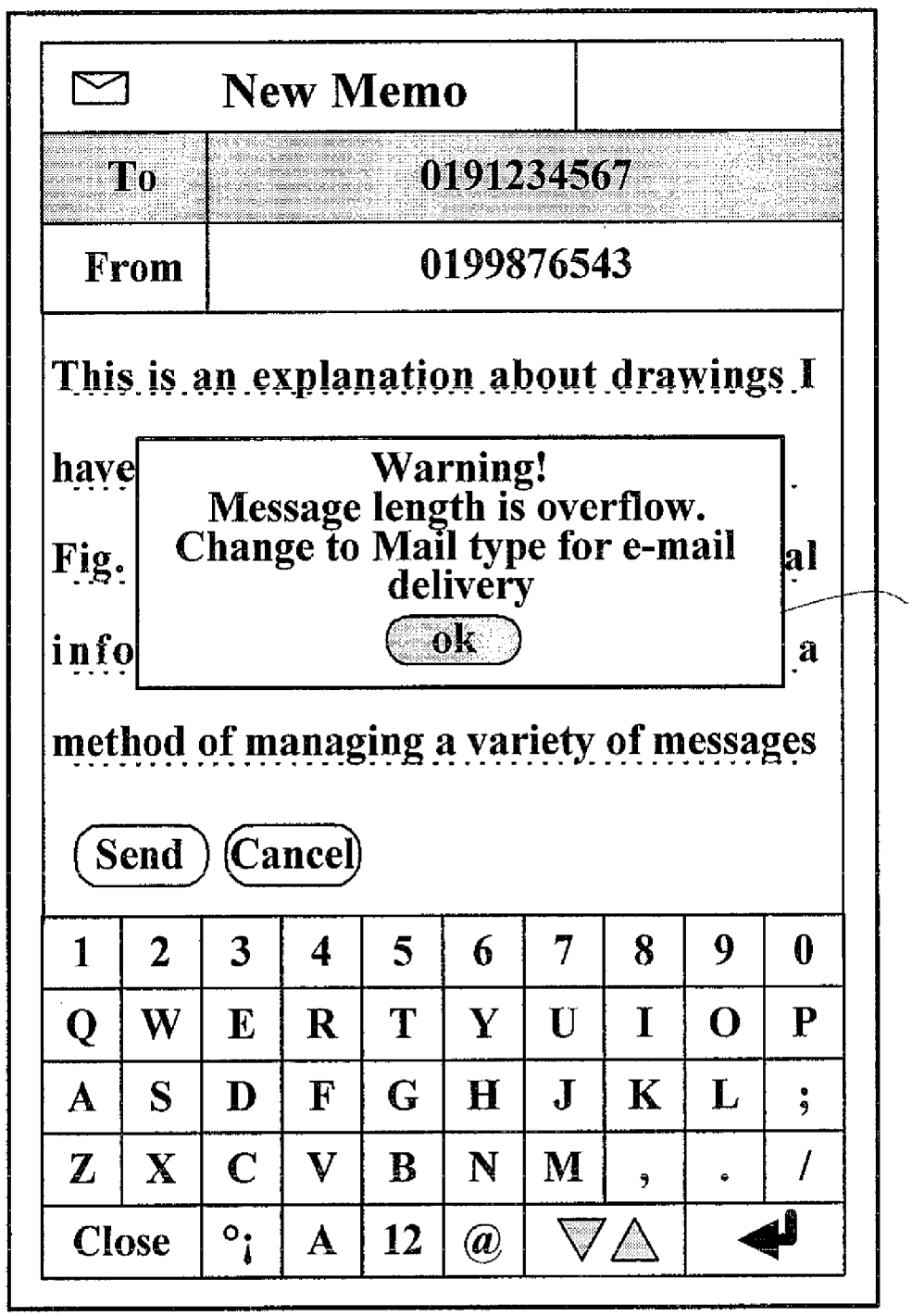
FIG. 9 is an illustrative 'New Memo' input screen in which a warning window asking to transmit through e-mail service when the size of written message is beyond limit.

If the counted size is greater than the maximum size, the controlling unit 26 outputs a warning message 101 which informs that the written memo is preferable to be sent through e-mail service and asks the user whether he or she wants to switch the current 'New Memo' to 'New Mail' screen, as shown in FIG. 9. If the user still wants the written memo in the form of SMS message, the controlling unit 26 slices the written memo into maximum-sized messages allowable in SMS and sends each of the sliced messages to the SMS format adapting unit 25 one by one through the message format converting unit 22. The sliced SMS-formatted messages are transmitted sequentially to a target terminal addressed by the 'To' field.

If the user wants to switch the input screen to 'New Mail', the controlling unit 26 searches a mapping table 44 of telephone number to e-mail address, which is pre-stored in the storage module 40 by the user, for the numeric digits filled in the 'To' field. If found, the controlling unit 26 copies the e-mail address associated with the found numeric digits of the mapping table 44 to the 'To' field of the newly-activated 'New Mail'. The controlling unit 26 conducts same operations for the 'From' field of the 'New Memo' and, if the numeric digits in the 'From' field are found in the mapping table 44, it sends an e-mail address associated with the found numeric digits to the POP3 unit 23 which will add the received originating e-mail address to the written message in accordance with the e-mail protocol.

If the numeric digits are not found in the mapping table 44, a corresponding field in the 'New Mail' screen is left blank in order that the user might fill in with proper e-mail address manually.

Through the above-explained method, a user can send a SMS message as well as a mail message through 'New Mail' screen and send a mail message as well as a SMS message through 'New Memo' screen, too. Therefore, a user need not confirm in advance which type a message to write belongs to in order to choose a suitable one of 'New Mail' for e-mail message and 'New Memo' for SMS message.

In the meantime, the controlling unit 26 also outputs an informative message telling "Please correct the automatically-substituted e-mail address if it is not correct".

If the user requests for transmission of the written message in the condition that all fields are filled in properly, the written message is transmitted in the form of e-mail message to a mail server of a recipient through processes explained in detail above.

In the case that the written message in the 'New Memo' screen is transmitted in the form of e-mail message as aforementioned because its length is too long to encapsulate into a SMS message, the controlling unit 26 composes an additional short SMS message, e.g., a phrase of "E-mail transmitted to you" destined for the subscriber number written in the 'To' field of the 'New Memo' and sends it to the SMS format adapting unit 25 to be delivered to same recipient. The reason why the additional SMS message is composed and sent is to make a recipient check the transmitted e-mail message as soon as possible because it is intended to be sent in the form of SMS message which can be acknowledged more promptly than the e-mail message.

Figure 10:
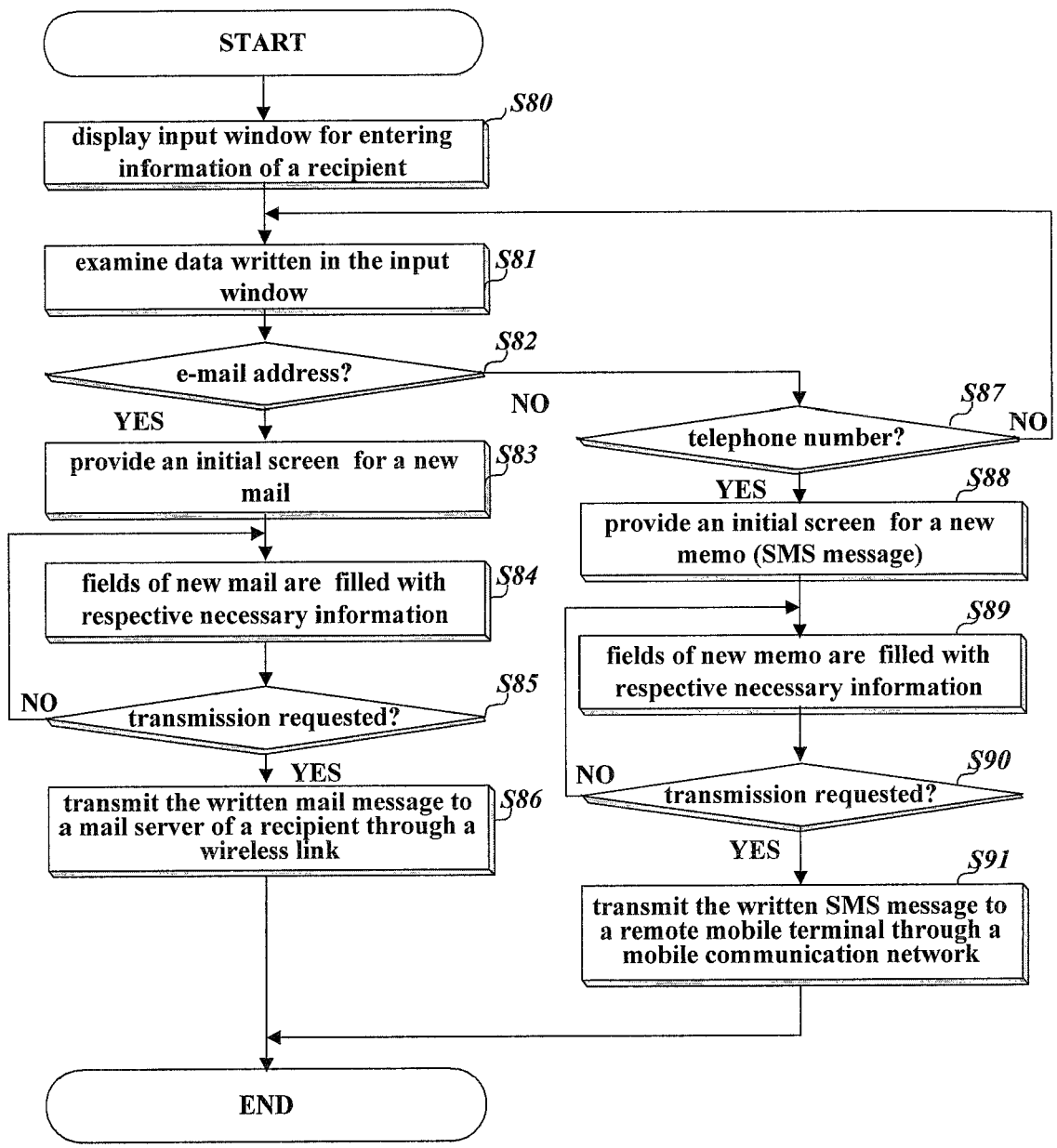
FIG. 10 is a flow chart of an embodiment of providing an input screen suitable for a message to write and transmitting a written message in accordance with a unified message management method of a personal information terminal.

FIG. 10 is a flow chart, conducted in a personal information terminal, of an embodiment of determining the type of a message to write, providing an input screen suitable for the determined message type, and transmitting a message written the provided input screen in accordance with a unified message management method.

In the procedure of FIG. 10, the controlling unit 26 outputs an input window demanding only information of a recipient (S80) first when a user requests for a new message. After data is entered in the input window completely, the controlling unit 26 commands the message type checking unit 21 to examine the entered data (S81). The message type checking unit 21 regards a message to write as SMS message when the entered data is composed of numeric digits, and as mail message when the entered data includes the symbol of '@' indicative of a mail account (S82). The identified message type by the message type checking unit 21 is notified to the controlling unit 26. Then, the controlling unit 26 provides the 'New Mail' screen of FIG. 7 if identified as mail message and the 'New Memo' screen of FIG. 8 if identified as SMS message (S83,S88). At this time, the controlling unit 26 copies the data entered in the input window to the 'To' field of the message input screen of FIG. 7 or 8.

After the user completes a message by filling in necessary information as well as a body message in fields of the message input screen (S84,S89) he or she requests for transmission of the completed message (S85,S90). Then, the message type converting unit 22 delivers the completed message to the POP3/SMTP unit 23 or the SMS format adapting unit 25 which will transmit the received message to a remote side in accordance with a protocol intended by 'New Mail' or 'New Memo' (S86,S91).

Owing to the above-explained method, there is no need that a user should choose a message input screen suitable for a message type to transmit.

The above-explained unified message management method of a personal information terminal makes a user confirm all types of received messages at a time and removes user's inconvenience that a message type to write should be distinguished in advance prior to choosing a message input screen.

It is one object to provide a unified message management method of a personal information terminal which displays plural types of messages all together through a single window, and transmits a completed message after matching it to a protocol determined based on information written in its field distinguishing a message type.

A unified management method of plural types of messages in a personal information terminal where each type has different message field set from others is characterized in that it comprises the steps of receiving and storing messages each type of which belongs to the plural types; composing unified management information including information written in fields of each of the stored messages; and displaying the stored plural types of messages all together with reference to the composed unified management information.

Another unified management method of plural types of messages in a personal information terminal where each type has different message field set from others is characterized in that it comprises the steps of reading information on a receiver of a written message of which type is intended to belong to one of the plural types; checking whether or not the read receiver information is matched with said one type; converting the written message to other type different from said one type based on a result of said checking step; and transmitting the type-converted message.

Another unified management method of plural types of messages in a personal information terminal where each type has different message field set from others is characterized in that it comprises the steps of checking whether or not a written message, of which type is intended to belong to one type among the plural types, satisfies conditions specified by said one type; converting the written message to other type different from said one type if at least one condition is not satisfied; and transmitting the type-converted message.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of one or more other embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A mobile terminal, comprising:
a memory to store input data;
a display configured to:
display a first input window configured to receive a first type message, wherein the first input window comprises a first window identifier and at least one first message field, the first window identifier indicative of a type of the first input window,
display a second input window configured to receive a second type message, wherein the second input window comprises a second window identifier and at least one second message field, the second window identifier indicative of a type of the second input window, and
a controller configured to:
determine, when the input data is received into at least one first message field of the first input window, whether the input data conforms to a format of the second input window corresponding to the second type message,
output a notification after the input data is determined to conform to the format of the second input window corresponding to the second type message, and
converting information of the first input window into the format of the second input window corresponding to the second type message, wherein the first and second input windows are displayed on the display.

2. The mobile terminal of claim 1, wherein the format of the second input window that corresponds to the second type message includes information that is not included in the first input window.

3. The mobile terminal of claim 1, wherein the converted information includes the input data received into the at least one first message field of the first input window.

4. The mobile terminal of claim 1, wherein the converted information is not output on the display.

5. The mobile terminal of claim 1, further comprising:
a transmitter to transmit the converted information based on a protocol corresponding to the second input window without displaying the converted information on the display.

6. The mobile terminal of claim 1, wherein a format of the first input window is provided for sending a SMS message and the format of the second input window is provided for sending an email message.

7. The mobile terminal of claim 1, wherein:
the at least one first message field includes a message address field, and
the controller is to check whether input data received in the message address field includes a predetermined symbol used for the second type message in order to determine whether the input data conforms to the format of the second type message.

8. The mobile terminal of claim 7, wherein the controller is to check whether input data received in the message address field includes an alphanumeric character in order to determine whether at least one of the input data conforms to a format of the second type message.

9. A mobile terminal, comprising:
a memory to store input data;
a display to display a first input window configured to receive a first message, wherein the first input window comprises a plurality of first message fields; and
a controller configured to determine, when the input data is received into at least one of the first message fields of the first input window, whether the input data does not conform to a format corresponding the first input window corresponding to the first message, and output a notification after the input is determined not to conform to the format corresponding to the first input window corresponding to the first message,
wherein the display is to display a second input window configured to receive a second message, wherein the second input window comprises at least one second message field different from the at least one first message field.

10. The mobile terminal of claim 9, wherein the first message includes information for sending at least one of a SMS message or an email message.

11. The mobile terminal of claim 9, wherein the plurality of the message fields includes a message address field, and wherein the controller is configured to display the notification when the input data for the message address field is determined to include an alphanumeric character.

12. The mobile terminal of claim 9, wherein: the plurality of the message fields includes a message address field, the controller is configured to check whether input data received in the message address field includes an alphanumeric character for the determination.

13. A method for controlling a mobile terminal, comprising:
displaying a first input window configured to receive a first type message, wherein the first input window comprises a first window identifier and at least one first message field, the first window identifier indicative of a type of the first input window;
receiving input data into at least one first message field of the first input window;
determining whether the input data conforms to a format of a second input window corresponding to a second type message;
outputting a notification after the input data is determined to conform to the format of the second input window corresponding to the second type message, wherein second input window comprises a second window identifier and at least one second message field; and
converting information of the first input window into the format of the second input window corresponding to the second type message, wherein the first and second input windows are displayed on the display at different times.

14. The method of claim 13, wherein the format of the second input window that corresponds to the second type message includes information that is not included in the first input window.

15. The method of claim 13, wherein the converted information includes the input data received into the at least one first message field of the first input window.

16. The method of claim 13, wherein the converted info nation is not output on a display.

17. The method of claim 13, wherein the converted information is transmitted based on a protocol that corresponds to the second input window without displaying the converted information on a display.

18. The method of claim 13, wherein the first input window is provided for sending one of an SMS message or an email message and the second input window is provided for sending the other of the SMS message or the email message.

19. The method of claim 13, wherein:
the at least one first message field includes a message address field, and
said determining comprises checking whether input data received in the message address field includes a predetermined symbol used for the second type message.

20. The method of claim 19, wherein said determining comprises:
checking whether input data received in the message address field includes an alphanumeric character.

* * * * *